(12) United States Patent
Zolotov

(10) Patent No.: US 8,313,030 B2
(45) Date of Patent: *Nov. 20, 2012

(54) SYSTEM AND METHOD FOR BARCODE SCANNING WITH COLOR IMAGE SENSORS

(75) Inventor: Serguei Zolotov, Ottawa (CA)

(73) Assignee: Psion Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,356

(22) Filed: Nov. 11, 2010

(65) Prior Publication Data

US 2012/0118970 A1    May 17, 2012

(51) Int. Cl.
*G06K 7/00* (2006.01)
(52) U.S. Cl. ............... 235/462.04; 235/462.01
(58) Field of Classification Search ............ 235/462.04, 235/468, 494
See application file for complete search history.

(56) References Cited

U.S. PATENT DOCUMENTS

| | | | |
|---|---|---|---|
| 8,079,525 B1 * | 12/2011 | Zolotov ............ 235/469 |
| 2003/0112471 A1 | 6/2003 | Damera-Venkata et al. |
| 2004/0199427 A1 | 10/2004 | van der Loo |
| 2007/0138286 A1 | 6/2007 | Kamijoh et al. |
| 2008/0265036 A1 * | 10/2008 | Wichers ............ 235/462.42 |
| 2010/0282851 A1 * | 11/2010 | Bulan et al. ............ 235/462.11 |
| 2011/0007967 A1 * | 1/2011 | Soderberg et al. ............ 382/165 |
| 2012/0000983 A1 | 1/2012 | Bhagwan et al. |

OTHER PUBLICATIONS

Co-pending Application to Applicant, U.S. Appl. No. 13/299,596.*
Wikipedia.org website, "Spectral Sensitivity", http://en.wikipedia.org/wiki/Spectral_Sensitivity; May 11, 2008.

* cited by examiner

*Primary Examiner* — Michael G Lee
*Assistant Examiner* — Matthew Mikels
(74) *Attorney, Agent, or Firm* — Perry + Currier Inc.

(57) ABSTRACT

A system and method are provided for barcode scanning for a target barcode comprising: receiving color image values for a captured image of the target barcode from at least one color image sensor; and extracting luminosity values for each pixel of the captured image from the color image values to define greyscale image values corresponding to the color image values. Once the luminosity values are defined, they are provided as greyscale image values to a greyscale barcode decoder for subsequent processing thereof.

18 Claims, 7 Drawing Sheets

SYSTEM AND METHOD FOR BARCODE SCANNING WITH COLOR IMAGE SENSORS

FIELD

The present invention relates generally to a system and method for barcode scanning with color image sensors.

BACKGROUND

As is known in the art, coding formats available today, such as barcodes, are useful due to their various applications including coding of manufacturer's product information such as books and other merchandise. Additionally, barcodes have been used for tracking purposes such as to track the movement of certain items including rental cars, airline luggage, nuclear waste, mail, express mail, and other parcels. Conventionally, current barcode scanners or readers are designed for use with grey scale images. This limits their capability as the imaging sensor technology is now largely driven by the consumer camera market where color sensors with continually increasing resolutions and greater light level sensitivities are desired. One way to address this issue has been to design barcode decoding algorithms that process color images directly. However, this is not feasible for many uses as such barcode decoders are computationally intensive and also expensive for current mass market use. Additionally, redesign of current greyscale barcode decoders to provide color barcode decoding is not feasible as it is expensive in terms of labour and time.

Accordingly, it is desirable to provide a solution for barcode scanning that obviates or mitigates at least some of the above mentioned disadvantages.

SUMMARY

In accordance with one aspect of the present invention there is provided a system and method for providing barcode scanning for a target barcode comprising: receiving color image values for a captured image of the target barcode from at least one color image sensor; extracting luminosity values for each pixel of the captured image from the color image values to define greyscale image values corresponding to the color image values; and providing the luminosity values defining greyscale image values to a greyscale barcode decoder for subsequent processing thereof.

In accordance with another aspect of the present invention there is provided a system and method for barcode scanning using image calibration for a captured image of a target barcode, the method comprising: receiving color image values for the captured image from a color image sensor; determining a set of coefficients for calibrating the captured image in dependence upon predefined sensor sensitivity profiles, the predefined sensor sensitivity profiles for defining spectral sensitivity values for the color image sensor for a range of predetermined wavelengths; and applying the set of coefficients to obtain calibrated image values such as to provide color balancing of the captured image.

In accordance with yet another aspect of the present invention there is provided a system and method for barcode scanning using image calibration for at least two captured images of target barcodes, the method comprising: receiving color image values for each captured image from a color image sensor; determining a set of coefficients for calibrating each captured image, the set of coefficients defined independently of images captured via the color image sensor; and applying the set of coefficients to the color image values associated with each captured image to obtain calibrated image values for each captured image such as to provide colour balancing for said at least two captured images.

In accordance with yet another aspect of the present invention there is provided a system and method wherein determining the set of coefficients is in dependence upon predefined sensor sensitivity profiles, the predefined sensor sensitivity profiles for defining spectral sensitivity values for the color image sensor for a range of predetermined wavelengths.

In accordance with yet another aspect of the present invention determining the set of coefficients further comprises: plotting spectral sensitivity values of the color image sensor for the range of predetermined wavelengths to obtain a plurality of sensitivity curves, each associated with a corresponding color spectrum within the range of predetermined wavelengths; obtaining an inverse value of the area under each sensitivity curve; and applying the inverse value associated with each color spectrum to the color image values associated with the corresponding color spectrum for each captured image.

BRIEF DESCRIPTION OF THE DRAWINGS

Embodiments of the present invention will now be described by way of example only with reference to the following drawings in which:

FIG. 5b illustrates a flowchart of another exemplary barcode scanning process in accordance with the embodiment of FIGS. 4 and 5a.

DETAILED DESCRIPTION OF THE PREFERRED EMBODIMENTS

As known in the art, some barcode scanners illuminate the barcode and use a scanner that is scanned across the barcode, while other barcode scanners employ an image sensor which captures an image of the barcode for subsequent processing. Accordingly, the term "barcode scanner" as used herein can also be used to refer to a "barcode reader". It is further noted that "color image sensor" as described herein may also referred to as an "image scanner" or "imager" that is configured to scan an image and produce a digital representation of the image.

In view of the limitations of existing barcode scanning techniques, it would be advantageous to provide a system and method for barcode scanning for use with color image sensors. That is, substantial advancements have been made in the resolution, light sensitivity and image quality of color sensors while greyscale sensor technology has become stagnant in its growth. Conversely, as discussed earlier, to design color barcode decoder for use with such color sensor is not feasible due to its cost and complexity. The present invention relates to developing a method and system for barcode scanning of color images as captured by one or more color sensors that are subsequently processed via greyscale barcode decoders. As will be described, the present invention relates to a system and method for a barcode scanner employing greyscale barcode decoding schemes with a color image sensor by converting the color image (e.g. as obtained from the color image sensor) into a greyscale image for subsequent processing with the greyscale barcode decoder of the barcode scanner.

It is noted that as used herein, the term "computing device" is intended to include a wide range of digital devices including, without limitation, devices which generate digital information, such as computer terminals, RFID readers, optical scanning devices including dedicated Bar Code Scanners, digital photo and document scanners etc. Accordingly, computing devices can include fixed and/or portable devices such as mobile computers, mobile phones, handheld terminals, digital cameras, scanners, other electronic devices configured to read and process barcode images.

Figure 1:
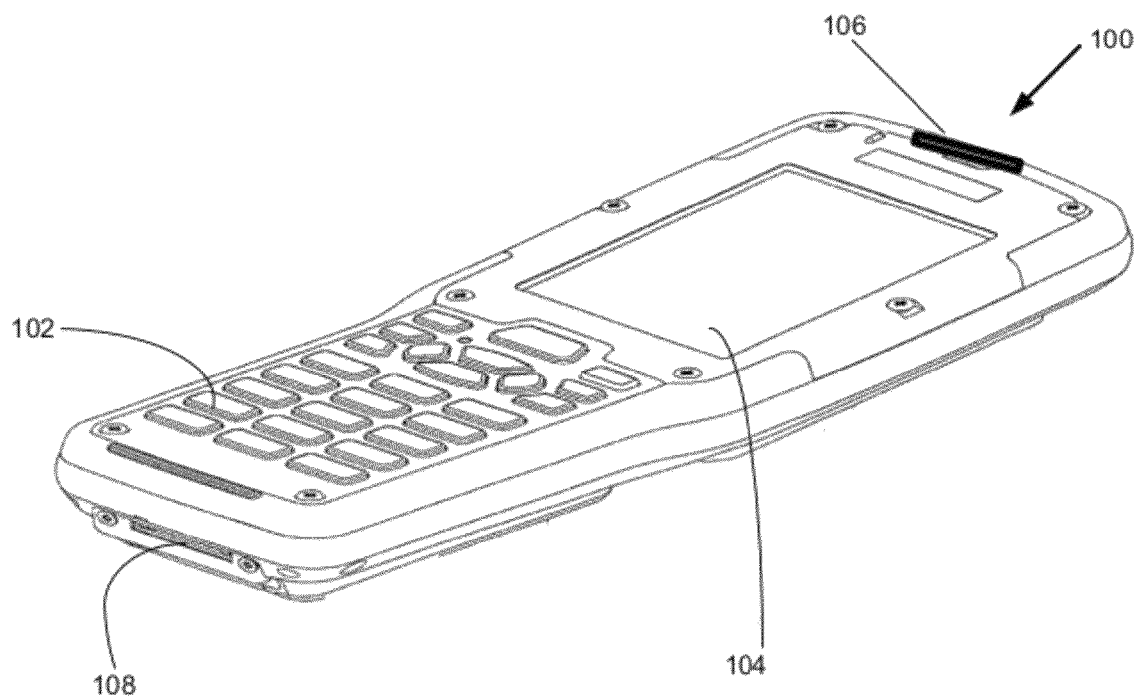
FIG. 1 illustrates an exemplary computing device including a color image sensor for barcode scanning in accordance with the present invention.
Figure 2:
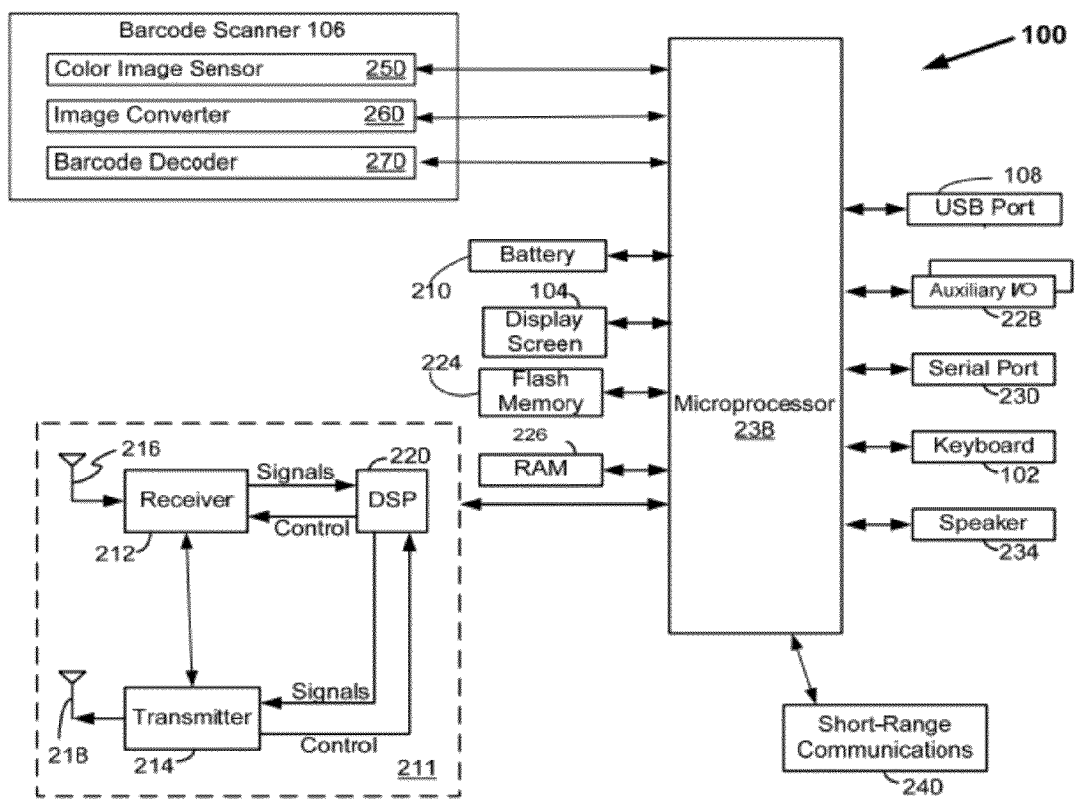
FIG. 2 is an exemplary conceptual diagram illustrating one embodiment of the components and functional subsystems of the computing device of FIG. 1.

Referring now to FIGS. 1 and 2, computing device 100 may include a keyboard 102 for user input, a display screen 104, and a barcode scanner 106 for optical barcode scanning functionality, and an expansion port 108. Barcode scanner 106, described in further detail below, may comprise a set of hardware, firmware, and system software, employed in any suitable combination thereof to accomplish barcode decoding using a color image sensor 250 for processing captured color images of target barcodes. That is, as will be described below, barcode scanner 106 uses a color to grey scale transformation of a scanned or captured color image (as obtained from color image sensor 250) to decode the image by using a greyscale image based decoder. The greyscale image based decoder may be a standard greyscale decoder as used in the art for decoding greyscale images of target barcodes. Expansion port 108 may be an exemplary Universal Serial Bus (USB) port or other similar expansion port for coupling compatible peripheral devices, such as, but not limited to, a communication and synchronization cradle for the handheld device.

As used herein, the term barcode refers to an optical machine-readable representation of data, which shows certain data on various products. Typically, barcodes represented data in the widths (lines) and the spacings of parallel lines, and may be referred to as linear or 1D (1 dimensional) barcodes or symbologies. They also come in patterns of squares, dots, hexagons and other geometric patterns within images termed 2D (2 dimensional) matrix codes or symbologies. The barcode images discussed herein for use with barcode scanner 106 can refer to either 1D or 2D barcodes. Typically, although 2D systems use symbols other than bars, they are generally referred to as barcodes as well. As will be described the barcodes can be read by optical scanners referred to also as barcode scanners 106.

FIG. 2 illustrates a block diagram of an exemplary architecture of the functional subsystems of computing device 100. Computing device 100, which may be a handheld device, can have the capability of communicating at least data, and possibly any of data, audio and voice communications, to and from devices as well as data acquisition sources within a communication network.

Computing device 100 may include wired or wireless communication capability. In the wireless configuration, the computing device 100 typically includes radio frequency (RF) communication subsystem 211, which includes a receiver 212, a transmitter 214, and associated components, such as one or more embedded or internal antenna elements 216 and 218, and a processing module such as a digital signal processor (DSP) 220. As will be apparent to those skilled in field of communications, the particular design of RF communication subsystem 211 depends on the specific communication network in which computing device 100 is intended to operate, but can include communication functionalities such as radio-frequency identification (RFID), Wi-Fi WLAN based on IEEE 802.11 standards, Zigbee, Z-Wave and the like.

Computing device 100 includes a microprocessor 238 which controls general operation of computing device 100. Microprocessor 238 also interacts with functional device subsystems, such as a display screen module 104, a flash memory 224, random access memory (RAM) 226, auxiliary input/output (I/O) subsystems 228, serial port 230, keyboard module 102, speaker 234, short-range communications subsystem 240, such as Bluetooth™ for example, and Universal Serial Bus (USB) expansion port 108 for peripherals. Computing device 100 may include a power source such as battery module 210 which may also be removable and replaceable from computing device 100.

Still with regard to FIG. 2, operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on computing device 100. A predetermined set of applications, which control basic device operations, or even more customized, advanced device operations, may be installed on computing device 100 during its manufacture, such as during the components configuration process described herein.

As will be apparent to those skilled in field of communications, the particular design of communication subsystem 211 depends on the communication network in which computing device 100 is intended to operate, and may include various communication functionalities as will be understood by a person skilled in the art.

Display screen module 104 of computing device 100 may be used to visually present a software application's graphical user interface (GUI) to a user via a display screen. Display screen module 104 may employ a touch screen display, in which case the user can manipulate application data by modifying information on the GUI using direct touches by a finger or stylus. Depending on the type of computing device 100, the user may have access to other types of input devices, such as, for example, a scroll wheel, trackball or light pen.

A graphical user interface presented at display screen module 104 of computing device 100 may enable an operator or administrator to interact therewith. It further contemplated that computing device 100 may be communicatively coupled to a remotely located database (not shown).

Computing device 100 further comprises barcode scanner 106. Barcode scanner 106 can comprise any suitable combination of software, firmware and hardware for implementing scanning of a target barcode 253 (see FIG. 3) with color image sensor 250 via greyscale barcode decoding technique by converting obtained or captured color images of the target barcode 253 to greyscale images for subsequent processing by greyscale barcode decoder 270.

Barcode scanner 106 comprises a color image sensor 250, an image converter 260 and a barcode decoder 270. Barcode scanner 106 can further include a light source and a lens (not shown) for cooperating with color image sensor 250 to capture an image of target barcode 253.

It is noted that although a single color image sensor 250 is discussed herein, color image sensor 250 may comprise a number of sensors as may be needed to capture and process an image of target barcode 253. For example, in one embodiment, different color image sensors 250 may be used to process 1D, or 2D barcodes respectively. In another embodiment, a number of color image sensors 250 may be used simultaneously to scan the target barcode 253 and provide RGB values and/or YUV values as desired. In yet another embodiment, a number of color image sensors 250 may be used such that each may be better suited for providing a particular type of color schemes (e.g. RGB or YUV or Bayer format as predefined) of target barcode 253.

Barcode scanner 106 processes a particular barcode by capturing a color image of target barcode 253 and measuring the intensity of the light reflected back via color image sensor 250. Accordingly, color image sensor 250 is adapted to produce a digital representation of the captured image of target barcode 253. The color image sensor 250 may be configured to provide an RGB image representation and/or a YUV image representation for subsequent input to image converter 260.

In one embodiment, a particular color can be represented as the combination of three primary colors red, green and blue provided in certain predefined quantities as per the RGB color format. Accordingly, in the present embodiment any color may be represented by the amount of Red, Green and Blue colors that it includes. This combination of primary colors is also often referred to as RGB values. For example, within images such as BMP, JPEG and PDF formats, each pixel of the image is represented with values for each of Red, Green and Blue quantities. As is known in the art, other color spaces such as CMYK can use four colors to define each pixel/color. In one aspect, in accordance with the RGB color format, color image sensor 250 is configured to provide an output representing each of the amount of intensity or hue of red, green and blue for the particular single color sensed by color image sensor 250 of the target barcode.

As described earlier, color image sensor 250 is configured to capture a color image of a target barcode 253 and to create a set of digital electrical signals representing an image of the imaged target barcode 253 (e.g. color image values 252). As will be described, color image sensor 250 is designed to measure the intensity of light reflected from an image being sensed (e.g. target barcode 253) using a light source and generate a digital representation of same. It is further noted that the combination of color image sensor 250, lens and one or more light sources as discussed herein may be part of a camera such as a digital still camera and/or a video camera for use with the present invention.

Accordingly, as described earlier, barcode scanner 106 comprises at least one light source (not shown) which is reflected on an image such as the target barcode 253 for subsequent capturing and decoding of target barcode 253. A light reflects on the target barcode 253 and is received by the color image sensor's 250 lenses. As described herein, in one embodiment, color image sensor 250 then produces three output voltages indicating quantities for each of the red, blue and green respectively (also referred to as RGB values). In one embodiment, color image sensor 250 may be configured to directly provide YUV image values from the RGB values detected. In another embodiment, color image sensor 250 provides any one of HSC (Hue, Saturation, Color), CMYK, CMY, Bayer format or other color space format as will be envisaged by a person skilled in the art imaged from the target barcode 253 that is then converted to RGB and/or YUV color format by one of color image sensor 250 or image converter 260.

Typically, the YUV model defines a color space in terms of one of a luminance or luma component (e.g. representing the brightness) as Y and U and V are the chrominance (color components). Luminance refers to perceptual brightness while "luma" is an electronic (voltage of display) brightness. The Y value described herein can refer to either one of luminance and/or luma values.

Figure 3:
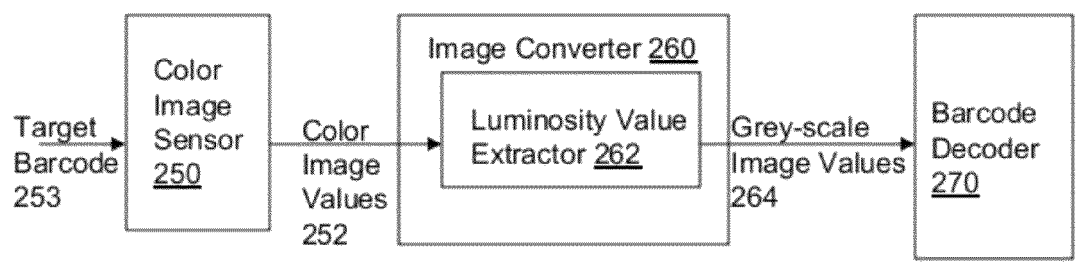
FIG. 3 illustrates a flowchart of an exemplary barcode scanning process, in accordance with one embodiment of the present invention as depicted in FIG. 2.

Referring to FIGS. 2 and 3, in one embodiment, color image sensor 250 may be configured to provide color image values 252 comprising RGB and/or YUV image values 252 to image converter 260 based on a scanned target barcode 253. Color image values 252 can comprise any one of an array, a vector, a matrix, and/or a data stream of data values comprising the RGB or other color space data for each pixel (picture element) of the color image sensor 250.

In accordance with one embodiment, image converter 260 is configured to convert color image values 252 received from color image sensor 250 into greyscale image values 264 for subsequent use by a substantially conventional barcode decoder 270 that is configured to process greyscale images of barcodes to decode the corresponding barcode information. Image converter 260 of computing device 100 can comprise any suitable combination of software, firmware, and hardware for implementing color image to greyscale image conversion for the greyscale barcode decoder 270.

In an embodiment where color image sensor 250 provides RGB values, image converter 260 is further configured to perform an RGB to YUV conversion as described herein to generate YUV values for target barcode 253. Otherwise, when the color image sensor 250 provides YUV values for target barcode 253 directly, image converter 260 is configured to further decompose the YUV values and extract the Y values (i.e. for each pixel of the target barcode 253) via a luminosity value extractor 262. That is, to calculate a greyscale image equivalent of a color image, only the Y signal needs to be communicated to barcode decoder 270.

Various suitable methods for transforming RGB signal (red, green, blue) values to YUV signal values will be apparent to those skilled in the art. One typical method comprises, weighting values of R, G, and B and summing them to produce a corresponding Y value, as a measure of the overall brightness or luminance.

From the YUV values of the color image values 252, however obtained, the Y component (also referred to as the luminance component) is extracted via a luminosity value extractor 262 of the image converter 260. Accordingly, greyscale image values 264 comprising luminance (also referred to as Y) values are provided to barcode decoder 270. That is, in the present embodiment, the greyscale image values 264 provide pixel values corresponding to the Y component of the color pixels for the target barcode 253 scanned by the color image sensor 250.

It is also contemplated that color image sensor 250 can provide Bayer format color values for the color image values 252 to image converter 260. Accordingly, in such an embodiment, image converter 260 is configured to convert pixel color information from the Bayer format to RGB format as will be understood by a person skilled in the art. Once the RGB image values are obtained, conversion to YUV values and luminosity (Y) value extraction (for each pixel of the color image values 252) occurs via luminosity value extractor 262 for subsequent processing by barcode decoder 270. In another embodiment, luminosity values may be extracted directly from Bayer format color values by standard methods.

Referring to FIGS. 2 and 3, barcode decoder 270 can comprise any suitable combination of software, firmware and hardware for implementing greyscale decoding based on processing grey scale image values as received from image converter 260. That is, barcode decoder 270 is configured to combine the digital signals (e.g. greyscale image values 264) received from the image converter 260 into a series of characters that represent the barcode data. Greyscale barcode decoder 270 can comprise any suitable standard barcode decoder adapted for use with greyscale images as will be understood by a person skilled in the art.

As will now be apparent to those skilled in the art, based on the discussion above, computing device 100 uses color image sensor 250 to image a target barcode 253 to acquire color image values 252 representing a target barcode 253. These color image values 252 are then processed by image converter 260 (and/or luminosity value extractor 262) to obtain greyscale image values 264 that can be processed in a substantially conventional manner, by any suitable greyscale barcode decoder 270. By converting the color image values 252 to greyscale image values 264, the need for a computationally expensive and/or difficult to implement color barcode decoder is eliminated.

Figure 4:
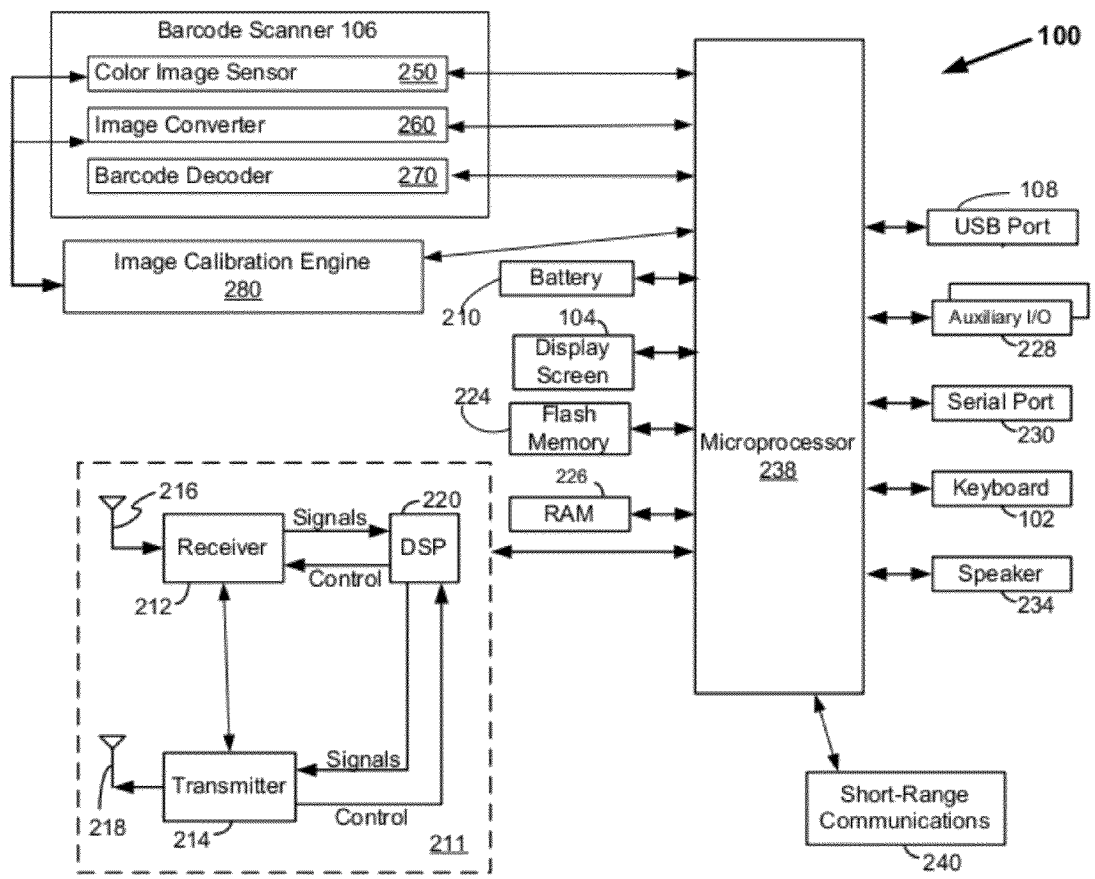
FIG. 4 is an exemplary conceptual diagram illustrating another embodiment of the components and functional subsystems of the computing device of FIG. 1.

Referring now to FIG. 4, computing device 100 is depicted in accordance with another embodiment of the present invention. In this embodiment, the computing device 100 comprises an image calibration engine 280 in addition to the components and functionalities depicted in FIG. 2. Image calibration engine 280 can comprise any suitable combination of software, firmware and hardware for implementing static color balancing for color image sensor 250.

Figure 6:
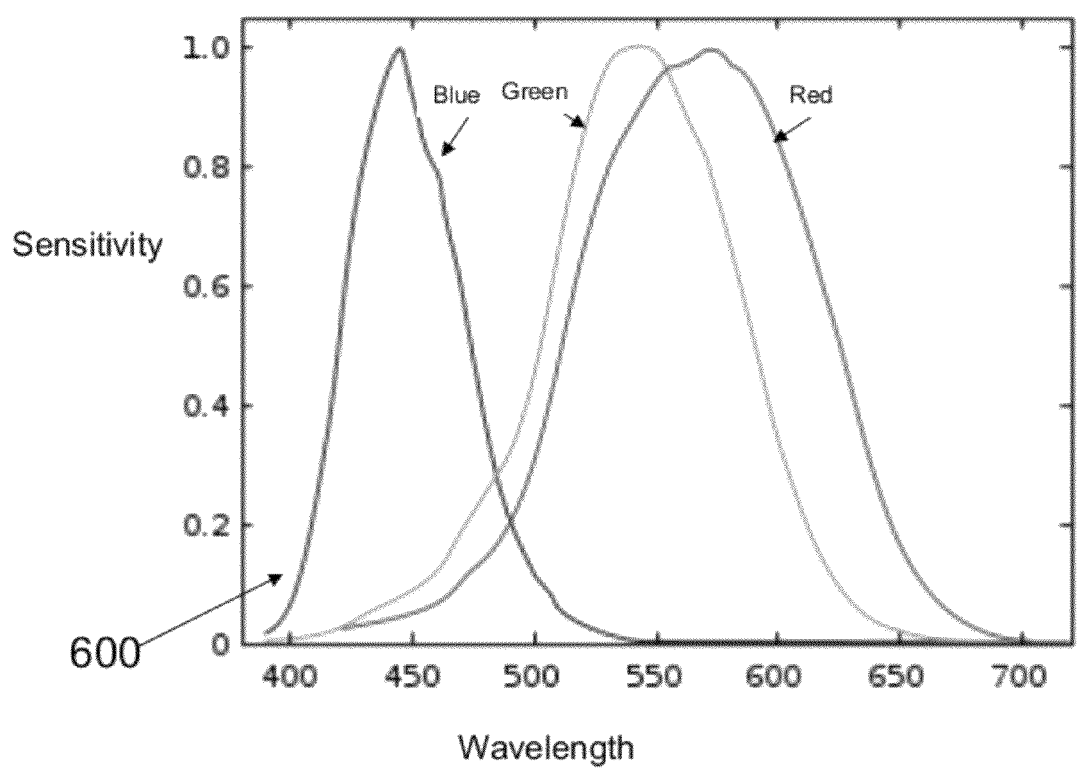
FIG. 6 illustrates an exemplary diagram of spectral sensitivities for a particular color image sensor.

As can be understood, different color image sensors 250 have different spectrum sensitivities as can be seen by their spectrum sensitivity curves. Referring to FIG. 6, the spectrum sensitivity curves 600 for a particular color image sensor 250 are depicted. As illustrated, different colors of the target barcode 253 will be acquired with different intensities in color image values 252 for color image sensor 250.

Figure 5A:
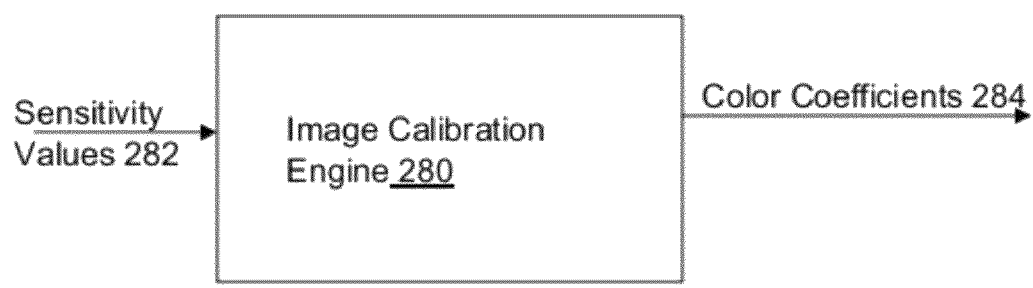
FIG. 5a illustrates a flowchart of an exemplary process for image calibration engine in accordance with the embodiment of FIG. 4.
Figure 5B:
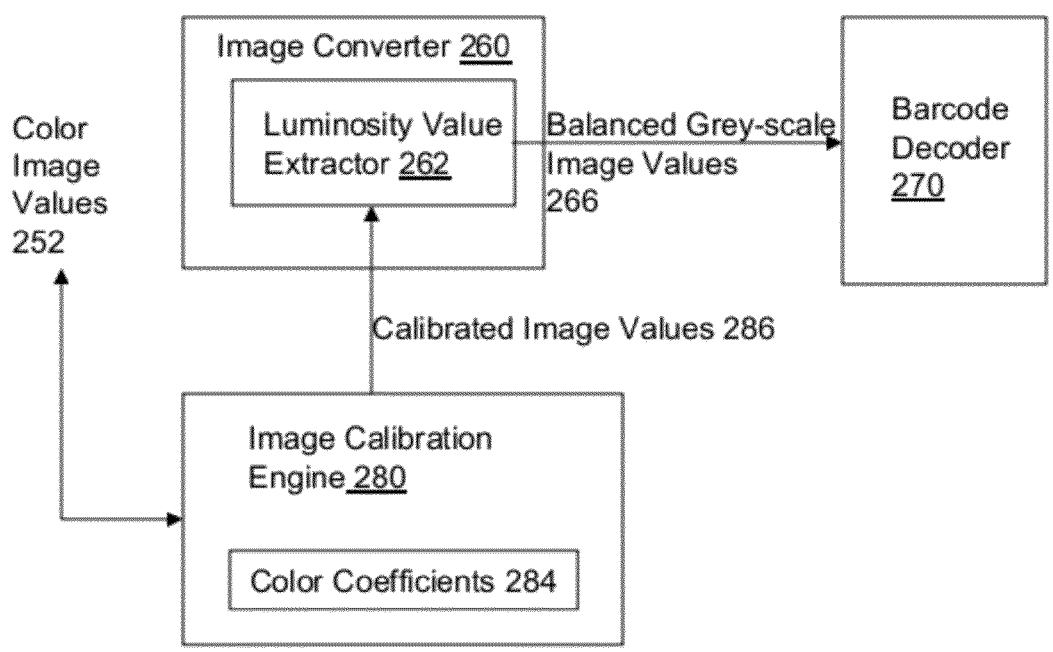

Referring to FIGS. 5a and 5b, image calibration engine 280 is configured to generate "color weights" or "color coefficients" 284 for each primary color (red, green and blue) such as to compensate for the specific spectral sensitivities of color image sensor 250 to obtain a color balance.

In the embodiment depicted in FIGS. 5a and 5b, the color coefficients 284 are static. That is, they are generated once and used to compensate for spectral sensitivities of color image sensor 250 to provide color balancing thereof for at least two captured images of at least one target barcode 253. That is, once the static color coefficients 284 are generated via the sensitivity values 282, the same color coefficients 284 are employed to provide calibrated image values 286 for at least two different captured images of target barcode(s) 253. As will be understood, static color coefficients provide an advantage over coefficients that are defined at runtime based on captured images of the target barcode. Runtime or dynamically defined coefficients are typically dependent on each captured image of the target barcode 253 and are varied or adjusted based on color values sensed from each image captured.

Referring again to FIGS. 5a and 5b, color image values 252 as provided by color image sensor 250 are communicated to image calibration engine 280. As shown in FIG. 5a, image calibration engine 280 is configured to provide color coefficients 284 in response to sensitivity values 282 associated with the particular color image sensor 250. That is, as described earlier, color coefficients 284 are associated with color image sensor 250 and once defined are applied to at least two captured images of target barcode 253 (either the same barcode or different barcodes 253). Sensitivity values 282 can comprise spectral sensitivity information associated with color image sensor 250 for a range of predetermined wavelengths as illustrated in FIG. 6 by several colour spectrum sensitivity curves. The sensitivity values 282 can be predetermined and/or obtained from color image sensor 250 manufacturer's specification or determined empirically in any known manner. As described herein, sensitivity curves depicted in FIG. 6 for defining sensitivity values 282 can be further in response to pixel color filters, pixel light spectral sensitivity and lens spectral characteristics as associated with a particular color image sensor 250.

In one embodiment, image calibration engine 280 determines the set of color coefficients 284 independently of images captured via the color image sensor 250 (e.g. independent of captured images of target barcodes 253). That is, in one aspect of the present embodiment, the color coefficients 284 are dependent on color image sensor's 250 predefined (i.e. manufacturer defined) characteristics such as spectral sensitivity values 282 (e.g. FIG. 6). As is known by a person skilled in the art, color image sensor's 250 spectral sensitivity values 282 are typically provided in color image sensor's 250 technical specifications. That is, the sensitivity values 282 and thus the color coefficients 284 according to the present aspect are derived independent of any images captured from color image sensor 250. Typically, spectral sensitivity measurements are provided in optical lab environments during sensor design and prototyping or via other suitable measures as will be envisaged by a person skilled in the art. In the present aspect, exemplary methods for calculating the color coefficients 284 in response to sensitivity values 282 are described herein.

As mentioned above, FIG. 6 illustrates an exemplary graph of spectral sensitivity versus wavelength values for a particular color image sensor 250. Each of the curves represent one of the primary colours red, green and blue. It can be seen that the spectral sensitivity distribution varies for each of the colours. Based on the spectral sensitivity curves for each of the colors, image calibration engine 280 determines a relationship between the sensitivity values for each of the primary colors (red, green and blue) for color image sensor 250. Based on the determined relationship between the sensitivity values which provides a measure of how sensitive color image sensor 250 is for each of the colour spectrums, image calibration engine 280 defines color coefficients 284 (FIG. 5a). Color coefficients 284 are used to compensate for the varying sensitivity of color image sensor 250 for different colour spectrums such as to provide calibrated image values 286. That is, the sensitivity values 282 provide an indication of how sensitive color image sensor 250 is to each of the red, blue and green color spectrums. In response to the sensitivity values 282, the color coefficients 284 provide a weighting to be applied to the color image values 252 to generate calibrated image values 286 for compensating for color image sensor's 250 spectral sensitivity. Accordingly, the calibrated image values 286 are the color image values 252 weighted or multiplied by color coefficients 284 (FIG. 5b).

As described above and referring to FIG. 5b, in one embodiment, image converter 260 is configured to extract luminosity values 262 or Y values from calibrated image values 286. As described earlier, if the calibrated image values 286 are in RGB format or any other color format, they are first converted into YUV values from which the Y values or luminance values are extracted and output as balanced greyscale image values 266. As also described earlier, image values 266 are provided to barcode decoder 270 for subsequent processing and analysis.

Accordingly, based on the sensitivity values 282, the color image values 252 (e.g. RGB image values) is processed to achieve color balancing for color image sensor 250 prior to calculation of the Y or luminance value being processed at image converter 260. Subsequent to extracting the Y values from the color image values 252, balanced greyscale image values 266 are provided to greyscale barcode decoder 270 for subsequent processing thereof.

Accordingly, the embodiment depicted in FIG. 5*b* provides a process for static colour balancing that can generate color balanced images without any additional colour balancing procedures. That is, based on sensitivity values 282, color coefficients 284 are determined once for color image sensor 250. Subsequently, for each new barcode image provided as color image values 252 from color image sensor 250, previously defined color coefficients 284 associated with color image sensor 250 are applied to generate calibrated image values 286. Accordingly, the present embodiment allows static color coefficients 284 or color weight coefficients to be selected once on computing device 100 which saves processing power and is computationally much less intense than color balancing at run time as is currently performed. That is, current color balancing techniques utilizing runtime balancing which is re-performed for each new image to be decoded. Additionally, current color balancing techniques are based on trial and error methods to constantly adjust color coefficients to achieve color balancing. Furthermore, the present embodiment provides static color coefficients 284 in dependence upon sensitivity values 282 that are derived from and directly related to spectral sensitivity curves (e.g. 600 in FIG. 6) for particular color image sensor 250 of computing device 100.

Referring again to FIG. 6, it is desirable that for a particular color image sensor, the area under each of the blue, green and red spectrum curves 600 should be the same. In one embodiment, color coefficients 284 for each colour spectrum are generated by image calibration engine 280 in dependence upon the area under each of the colour spectrum curves (e.g. red, green and blue spectrum curves).

That is, according to the present embodiment, spectral sensitivity values 282 of a particular color image sensor 250 associated with a range of predetermined wavelengths is plotted to obtain a plurality of sensitivity curves, each curve is associated with a corresponding color spectrum (e.g. red, green or blue) within the range of predetermined wavelengths. An example of sensitivity curves for a particular color image sensor 250 being illustrated in FIG. 6. Image calibration engine 280 is configured to determine color coefficients 284 for each of the colour spectrums (red, green and blue) associated with color image sensor 250 by calculating or obtaining the inverse value of the square (or area) under each of the color sensitivity curves indicated as "Red", "Blue" and "Green". Accordingly, the inverse value of the area under each spectrum sensitivity curve provides balanced or normalized color coefficients 284. For example, the inverse of the area under the blue spectrum curve as provided by color coefficients 284 (in response to sensitivity values 282) is applied to the blue color values (e.g. as defined by RGB values) of color image values 252 obtained from color image sensor 250. The process is repeated for each of the colour spectrums (e.g. red and green) to apply the color coefficient 284 associated with a particular color to the color image values 252 associated with the same color.

Referring again to FIG. 6, it is noted that blue, green and red sensitivity curves shapes can be further dependent on color image sensor 250 characteristics such as pixel colour filters, pixel light spectral sensitivity, and lens spectral characteristic.

Accordingly, in one scenario, sensitivity values 282 as provided from sensitivity curves (e.g. FIG. 6) provide sensitivity information for color image sensor 250 indicating that color image sensor 250 is less sensitive to the blue color spectrum by a predefined factor than the red or green color spectrums (e.g. as can be seen from spectral sensitivity curves in FIG. 6). Accordingly, by determining the static color coefficients 284 from the inverse value of the area under the blue, red, and green color spectrum curves (e.g. FIG. 6), the static color coefficients 284 provide a weighting of the predefined factor to be applied to the blue colour values of the color image values 252 to increase the blue color values accordingly. Alternatively, a weighting could be applied to the red and green color values to decrease those values by the predefined factor to achieve a similar result. As will be apparent to those of skill in the art, in most scenarios a suitable weighting is applied to at least two of the Red, Green and Blue color values to reduce, or eliminate, the effect of the different color sensitivities of color image sensor 250.

In one embodiment and referring to FIGS. 1-6, the target barcode is a greyscale barcode image via a color image sensor 250.

The greyscale barcode decoder 270 comprises any suitable combination of software, firmware and hardware implementing appropriate decoder schemes for analyzing a greyscale captured image of target barcode 253, as captured by color image sensor 250 and processed by image converter 260 (see FIGS. 3 and 5). The greyscale barcode decoder 270 can further send the decoded barcode image to the output of barcode scanners 106 for subsequent access by microprocessor 238 and any of the peripheral components of computing device 100 as depicted in FIGS. 2 and 4.

Although the embodiments described in relation to FIGS. 5*a* and 5*b* relate to determining the color coefficients 284 on a static basis, that is to determine the color coefficients in response to the sensitivity values 282 once and apply the same color coefficients 284 to at least two different color image values 252 associated with captured images of target barcode 253, other static and runtime methods for providing color balancing and image calibration can be envisaged. As will be described, the image calibration engine 280 may be configured to determine the color coefficients 284 in response to images captured by the color image sensor 250 and their visual characteristics (e.g. color response, color temperature, color spectrum values, etc.) and to dynamically or statically adjust subsequent images captured by the color image sensor 250. In one example, the image calibration engine 280 may be configured to perform static calibration as follows. A white paper is placed in front of the color image sensor 250, pure white illumination is supplied to illuminate the paper. The sensed color response for each color as provided by the color image sensor 250 (e.g. via color image values 252) are measured. The color coefficients 284 are then calculated based on the color response for each color as provided by color image sensor 250.

In another aspect, dynamic or runtime based color balancing for color image sensor 250 as provided by image calibration engine 280 employs capturing an image via color image sensor 250, taking into account color change edges above a certain predefined threshold, verifying that the sum of green, red and blue color values are equal and adjusting the individual color gain amplification or color coefficients 284 until the sum of each of the green, red and blue color values of the captured test image are equivalent. The color coefficients 284 are then used for subsequent images while monitoring the green, red, and blue color values of subsequent images for determining whether adjustments to the color coefficients 284 are in order.

In yet another aspect, color balancing as provided by image calibration engine 280 employs dynamic color balancing as follows. First, the overall picture temperature is calculated as is known in the art. Second, individual color gain amplification (also referred to as color coefficients 284) is calculated to obtain desired temperature.

It is noted that the disclosure herein has been described with reference to specific exemplary embodiments; however, varying modifications thereof will be apparent to those skilled in the art without departing from the scope of the invention as defined by the appended claims.

The invention claimed is:

1. A method for providing barcode scanning for a target barcode comprising:
   receiving color image values for a captured image of the target barcode from at least one color image sensor;
   extracting luminosity values for each pixel of the captured image from the color image values to define greyscale image values corresponding to the color image values; and
   providing the luminosity values defining greyscale image values to a greyscale barcode decoder for subsequent processing thereof.

2. The method of claim 1 wherein the color image values comprise RGB image values, the method further comprising:
   converting RGB image values to YUV values; and
   extracting the luminosity values in dependence upon the YUV values.

3. The method of claim 1 wherein the color image values are selected from the group consisting of: Bayer format color image values, CMYK format color image values, CMY format color image values and HSC format color image values.

4. The method of claim 3, wherein the color image values are converted to RGB image values and subsequently to YUV values for extracting the luminosity values in dependence thereon.

5. The method of claim 1, wherein the target barcode is a greyscale barcode.

6. The method of claim 1, wherein the color image values comprise YUV values.

7. The method of claim 1 further comprising:
   determining a set of coefficients for calibrating the captured image in dependence upon predefined sensor sensitivity profiles, the predefined sensor sensitivity profiles for defining spectral sensitivity values for the color image sensor for a range of predetermined wavelengths; and
   applying the set of coefficients to obtain calibrated image values such as to provide color balancing of the captured image.

8. The method of claim 7 wherein determining the set of coefficients is independent of images captured via the color image sensor.

9. The method of claim 1 further comprising: determining a set of coefficients for calibrating the captured image in dependence upon color characteristics of the captured image for defining calibration of subsequent images.

10. A computing device for providing barcode scanning for a target barcode comprising:
    a processor;
    at least one color image sensor for providing color image values for a captured image of the target barcode;
    a greyscale barcode decoder for decoding greyscale images;
    a memory coupled to the processor having instructions stored thereon for execution by the processor, the memory comprising instructions for:
       extracting luminosity values for each pixel of the captured image from the color image values to define greyscale image values corresponding to the color image values; and
       providing the luminosity values defining greyscale image values to the greyscale barcode decoder for subsequent processing thereof.

11. The computing device of claim 10 wherein the color image values comprise RGB image values, the memory further comprises instructions for:
    converting RGB image values to YUV values; and
    extracting the luminosity values in dependence upon the YUV values.

12. The computing device of claim 10 wherein the color image values are selected from the group consisting of: Bayer format color image values, CMYK format color image values, CMY format color image values and HSC format color image values.

13. The computing device of claim 12, wherein the memory further comprises instructions for:
    converting color image values to RGB image values and subsequently to YUV values for extracting the luminosity values in dependence thereon.

14. The computing device of claim 10, wherein the target barcode is a greyscale barcode.

15. The computing device of claim 10, wherein the color image values comprise YUV values.

16. The computing device of claim 10, wherein the memory further comprises instructions for:
    determining a set of coefficients for calibrating the captured image in dependence upon predefined sensor sensitivity profiles, the predefined sensor sensitivity profiles for defining spectral sensitivity values for the color image sensor for a range of predetermined wavelengths; and
    applying the set of coefficients to obtain calibrated image values such as to provide color balancing of the captured image.

17. The computing device of claim 16, wherein determining the set of coefficients is independent of images captured via the color image sensor.

18. The computing device of claim 10, wherein the memory further comprises instructions for:
    determining a set of coefficients for calibrating the captured image in dependence upon color characteristics of the captured image for defining calibration of subsequent images.

* * * * *